United States Patent [19]

Jacks et al.

[11] Patent Number: 4,495,861
[45] Date of Patent: Jan. 29, 1985

[54] COOKING UTENSIL

[76] Inventors: Shirley L. Jacks, 109 Arroyo Dr., Danville, Calif. 94526; Sun W. Ng, 18 Barcelona Ave., San Francisco, Calif. 94115

[21] Appl. No.: 544,626

[22] Filed: Oct. 24, 1983

[51] Int. Cl.³ ............................................. A47J 37/06
[52] U.S. Cl. ...................................... 99/422; 99/340; 99/426; 99/448; 99/449
[58] Field of Search ................. 99/422, 426, 448, 449, 99/340, 446, 425; 126/25 R, 390

[56] References Cited

U.S. PATENT DOCUMENTS

| | | | |
|---|---|---|---|
| 2,454,054 | 11/1948 | Gibb | 99/449 |
| 2,515,617 | 7/1950 | Tilford | 99/422 X |
| 3,509,814 | 5/1970 | Karapetian | 99/446 X |
| 3,678,844 | 7/1972 | Marshall | 99/425 X |
| 3,937,138 | 2/1976 | Tidwell | 126/25 R X |
| 4,108,142 | 8/1978 | Barson | 99/446 X |
| 4,342,259 | 8/1982 | Lee | 99/425 |

*Primary Examiner*—Billy J. Wilhite
*Attorney, Agent, or Firm*—Niro, Jager & Scavone

[57] ABSTRACT

A cooking utensil is disclosed for use on a barbeque-type device which includes a bowl for containing a heating medium. A generally planar cooking surface has peripheral dimensions less than the cross dimensions of the upper rim of the barbeque bowl. Handles project outwardly of the cooking surface generally coplanar therewith for supporting the cooking surface on the bowl rim. Divider flanges separate one side of the cooking surface into distinct cooking sections. A stop flange is disposed about a portion of the periphery of the opposite side of the cooking surface. The divider flanges and the stop flange prevent the cooking utensil from sliding off of the rim of the barbeque bowl.

12 Claims, 5 Drawing Figures

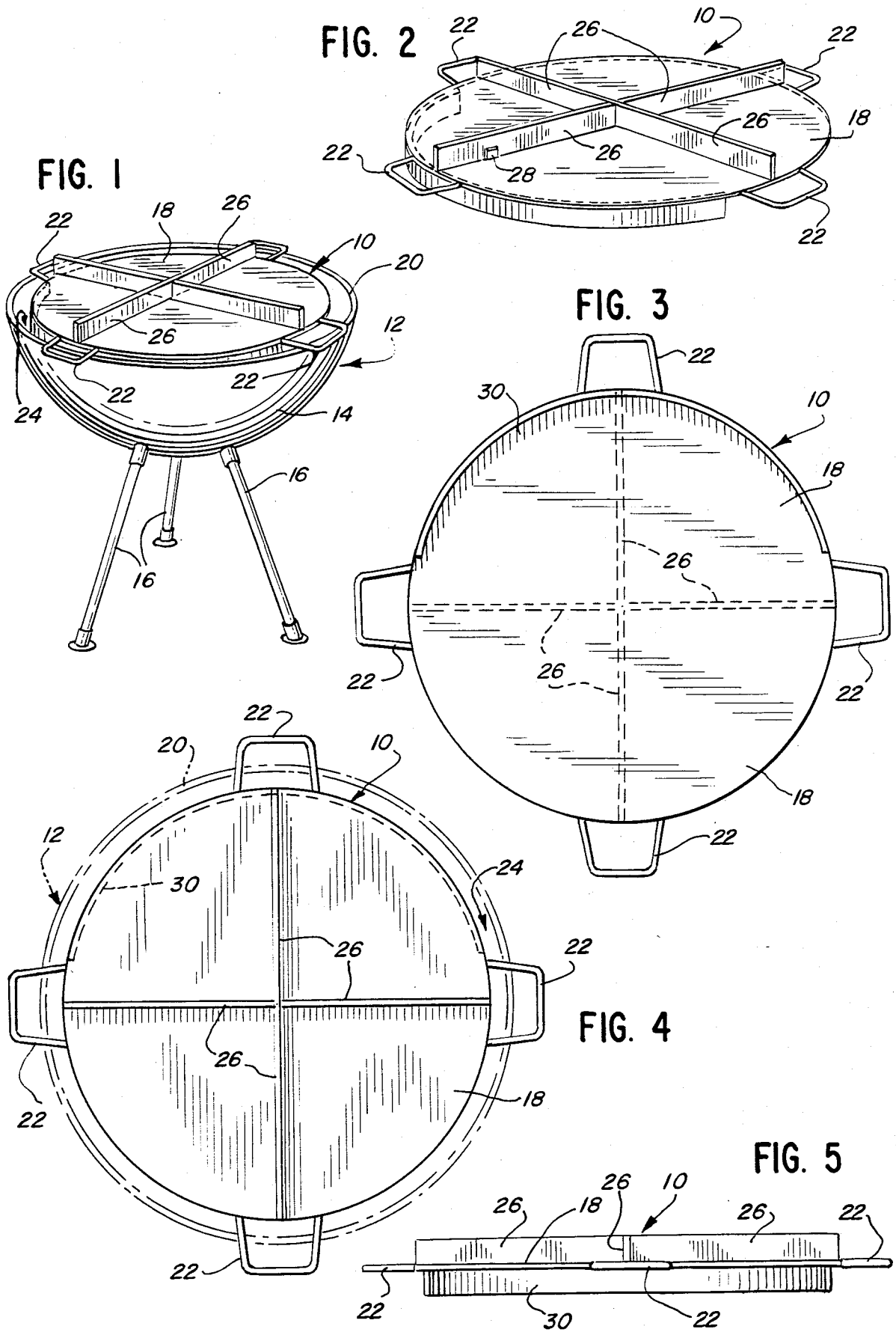

COOKING UTENSIL

BACKGROUND OF THE INVENTION

The present invention relates generally to cooking utensils and, more particularly, to a cooking surface-type utensil for use on barbecue-type devices which include bowls for containing a heating medium.

A group cookout activity has become popular and has been commonly called a "Mongolian cookout". This activity involves the provision of a buffet of uncooked items such as a variety of uncooked meats and a variety of complementary uncooked vegetables or the like. One or more relatively large barbeque-type devices are provided with relatively large cooking surface units. Participants or guests pass through the buffet to serve themselves with their selected meat(s) and vegetables or the like and place the selected uncooked items into their own individual plates or containers. The selected uncooked items then are taken to the relatively large barbeque devices and are cooked on the surface units for eating purposes. This can be done outdoors or indoors with proper facilities provided.

With large cooking units, the individuality of this activity often is lost because it is too similar to the cooking scheme used in various eating establishments utilizing large surface cooking units.

Attempts have been made to carry this scheme into an outdoor environment by utilizing a number of smaller barbeque-type cooking devices which include a kettle or bowl containing a heating medium, such as charcoal briquettes or gas. Smaller cooking plates or pans are used by the guests to select their uncooked items and the plates or pans simply are placed on top of the grid or grate of the barbeque devices.

Various problems have been encountered with the latter scheme due to the lack of a provision for complementing the cooking surface plate or pan with the barbeque device itself. For instance, the grid or grate of a barbeque device often is not level and placing a flat surface unit directly on top of the grid causes instability and the food items often fall into the bowl of the barbeque device. If larger surface cooking units are used with the barbeque device, there often is insufficient air circulation and the charcoal or gas is smothered. Further problems are encountered during manipulation or turning of the food items which often results in the items falling into the barbeque bowl.

It also would be desirable to have a cooking unit for use in the scheme described above in which a particular cooking surface utensil could be divided into distinct sections and used as a common utensil simultaneously by a plurality of guests to enhance the activities' camaraderie.

The present invention is directed to providing a cooking utensil for use in a group cookout activity of the character described and which solves many of the problems previously encountered, as described above, and to fulfill a definite need.

SUMMARY OF THE INVENTION

An object, therefore, of the invention is to provide a new and improved cooking utensil of the cooking surface-type.

Another object is to provide a cooking utensil particularly adapted for use on a barbeque-type device which includes a bowl for containing a heating medium.

In the exemplary embodiment of the invention, means is provided defining a generally planar cooking surface having peripheral dimensions less than the cross dimensions of the upper rim of the barbeque bowl or kettle. Means is provided for supporting the cooking surface means on the rim of the bowl.

In the preferred embodiment, the supporting means comprises a plurality of handles projecting outwardly from and spaced about the periphery of the cooking surface means. The handles span the space between the periphery of the cooking surface means and the barbeque bowl rim. The space between the cooking surface means and the bowl rim provide adequate ventilation and air circulation to the heating medium.

A feature of the invention is the provision of means for dividing at least one side of the cooking surface means into distinct cooking sections. This permits a number of individuals to use the same cooking utensil and yet maintain their selected items of food separate from the selections of another. In the embodiment of the invention disclosed herein, the dividing means comprises a plurality of diametrically disposed, intersecting upstanding flanges which divide the cooking surface means into a plurality of pie-shaped cooking sections. The upstanding flanges may be provided in a removable fashion to facilitate cleaning of the cooking utensil.

Another feature of the invention is the provision of an upstanding flange disposed about a portion of the periphery of the cooking surface means. This flange provides stop means for manipulating food items on the cooking surface means. The top flange is disposed on the side of the cooking surface means opposite the dividing flanges.

The dividing flanges and the stop flange provide means projecting from opposite sides of the cooking surface means for preventing the cooking utensil from sliding off of the rim of the barbeque bowl.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a barbeque-type device with the cooking utensil of the present invention disposed thereon;

FIG. 2 is a perspective view, on an enlarged scale, of the cooking utensil of the invention;

FIG. 3 is substantially a plan view of the cooking utensil illustrating the underside as viewed in FIG. 2;

FIG. 4 is substantially a plan view of the cooking utensil illustrating the top side as viewed in FIG. 2; and FIG. 5 is a side elevational view of the cooking utensil.

DETAILED DESCRIPTION OF THE PREFERRED EMBODIMENT

Referring to the drawings in greater detail, and first to FIG. 1, a cooking utensil, generally designated 10, is disclosed for use on a barbeque-type device, generally designated 12, which includes a kettle or bowl 14 for containing a heating medium such as charcoal briquettes. As is known, barbeque bowl 14 is provided with supporting means such as legs 16. At this point, it should be understood that although the barbeque device 12 is illustrated as circular and generally hemispheric in construction, and the cooking utensil 10 of the present invention is illustrated generally circular in configuration, the invention is not limited to any particular geometric configuration or size. For instance, many barbeque devices are generally rectangular in configuration and, correspondingly, cooking utensil 10 can be made in a complementary configuration for use therewith.

Referring to FIGS. 2–5 in conjunction with FIG. 1, the cooking utensil 10 of the present invention includes a circular, generally planar cooking surface means 18. Means is provided for supporting the cooking surface on the upper rim 20 (FIG. 1) of barbeque bowl 14. This means is provided in the form of a plurality of handles 22 projecting outwardly from and spaced about the periphery of cooking surface 18 generally coplanar therewith. The handles are generally U-shaped to permit easy grasping, carrying and manipulating the cooking utensil.

As can be seen best in FIGS. 1 and 4, cooking surface 18 is sized so that the peripheral dimensions thereof are less than the cross dimensions of the upper rim 20 of barbeque bowl 14. Handles 22 project outwardly from cooking surface 18 so that they rest on top of bowl rim 20. This provides ample space 24 between the periphery of cooking surface 18 and bowl rim 20 to permit ventilation and air circulation to the cooking medium within the barbeque bowl. With a circular cooking utensil 10 for use with a hemispherical barbeque bowl 14, in essence the diameter of cooking surface 18 is sufficiently less than the diameter of bowl rim 20 to provide adequate air circulation to the heating medium. Of course, if a rectangular cooking utensil and a rectangular barbeque bowl is used, the length and/or width of cooking surface 18 would be sufficiently less than the length and/or width of the rectangular barbeque bowl.

Means is provided for dividing at least one side of cooking surface 18 into distinct cooking sections. More particularly, a plurality of diametrically disposed, intersecting upstanding flanges 26 are provided on cooking surface 18 (only the top side as viewed in FIGS. 1 and 2) to divide cooking surface 18 into distinct pie-shaped cooking sections such as the four sections illustrated. Upstanding divider flanges 26 may be welded directly to cooking surface 18. However, all of the divider flanges 26 can be fabricated as a unit and be readily removable from cooking surface 18. For this purpose, a plurality of brackets 28 can be provided on top of the cooking surface for receiving and positioning the divider flanges. Only one bracket 28 is illustrated in FIG. 2. Not only do divider flanges 26 separate cooking surface 18 into distinct sections, but the flanges provide stop means to facilitate manipulating and "turning" various uncooked items within the distinct sections. It can be seen that by dividing cooking surface 18 into distinct sections, a number of individuals or guests can use the same cooking utensil to provide for camaraderie or a more fun activity as well as providing physical segregation of the food portions.

The opposite side of cooking surface 18 (i.e. the underside as viewed in FIGS. 1 and 2 or the top side as viewed in FIG. 3) is substantially unobstructed and is provided with an arcuate upstanding flange 30 extending about a portion of the periphery of cooking surface 18. Flange 30 provides stop means for manipulating and facilitating "turning" and removal of the food items when the opposite side is used as the cooking surface.

Divider flanges 26 and stop flange 30 also afford another important function in providing means on opposite sides of cooking surface 18 to prevent cooking utensil 10 from sliding off of rim 20 of barbeque bowl 14. To this end, and referring to FIG. 4, it should be noted that handles 22 project radially outwardly of cooking surface 18 a sufficient distance such that if the cooking utensil is moved completely to one side of the barbeque bowl, and either divider flanges 26 or stop flange 30 come into abutment with the inside of the bowl, the handles still are of sufficient length to adequately support the cooking utensil on rim 20 of the bowl. FIG. 5 best illustrates the projection of divider flanges 26 and stop flange 30 on opposite sides of cooking surface 18 to provide the safety feature of preventing the cooking utensil from sliding off of or dropping into the barbeque bowl.

From the foregoing, it can be seen that a new and improved cooking utensil has been provided for use on a barbeque-type device which includes a bowl for containing a heating medium. The cooking utensil is supported by handles on the rim of the bowl to insure that the utensil is constantly stabilized during use. Divider partitions 26 provide means for separating cooking surface 18 into distinct cooking sections. Stop flange 30, on the opposite side of the cooking surface provides means for manipulating the food items, and both the divider flanges and the stop flange prevent the cooking utensil from sliding off of or dropping into the barbeque bowl.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cooking utensil for use on a barbeque-type device which includes a bowl for containing a heating medium, comprising:

means defining a generally planar, substantially imperforate cooking surface having peripheral dimensions less than the cross dimensions of the upper rim of said bowl to define a space about the periphery of the cooking surface and the upper rim of the bowl for air circulation to the heating medium; and handle mans projecting outwardly from the periphery of the cooking surface means a sufficient distance for supporting said cooking surface means on the rim of said bowl and beyond said rim to facilitate lifting the cooking surface means off said bowl.

2. The cooking utensil of claim 1, including means projecting from at least one side of said cooking surface means for preventing the utensil from sliding off of the rim of the bowl.

3. The cooking utensil of claim 2 wherein said last named means includes partition means for dividing said one side of the cooking surface means into distinct cooking sections.

4. The cooking utensil of claim 2 wherein said last named means includes flange means disposed about at least a portion of the periphery of the cooking surface means.

5. The cooking utensil of claim 1, including partition means on one side of said cooking surface means for dividing the cooking surface means into distinct cooking sections.

6. The cooking utensil of claim 5, including flange means disposed about a portion of the periphery of said cooking surface means to provide stop means for manipulating food items.

7. The cooking utensil of claim 6 wherein said flange means is disposed on the side of said cooking surface means opposite said partition means.

8. The cooking utensil of claim 5, including means permitting ready removal of said partition means from said cooking surface means.

9. The cooking utensil of claim 1, including flange means disposed about a portion of the periphery of said cooking surface means to provide stop means for manipulating food items.

10. A cooking utensil for use on a barbeque-type device which includes a bowl for containing a heating medium, comprising:
   means defining a generally planar, substantially imperforate cooking surface having peripheral dimensions less than the cross dimensions of the upper rim of said bowl to define a space about the periphery of the cooking surface and the upper rim of the bowl for air circulation to the heating medium, one side of said cooking surface means having partition means for dividing said one side into distinct cooking sections, the opposite side of said cooking surface means including flange means disposed about at least a portion of the periphery thereof, said partition means and said flange means projecting sufficiently from the respective sides of the cooking surface means for preventing the utensil from sliding off of the rim of the bowl; and
   handle means projecting outwardly from the periphery of the cooking surface means a sufficient distance for supporting said cooking surface means on the rim of said bowl and beyond said rim to facilitate lifting the cooking surface means off said bowl.

11. The cooking utensil of claim 10 wherein said dividing means comprise a plurality of diametrically disposed, intersecting upstanding flanges.

12. The cooking utensil of claim 10, including means permitting ready removal of said dividing means from said cooking surface means.

* * * * *